Figure 1:
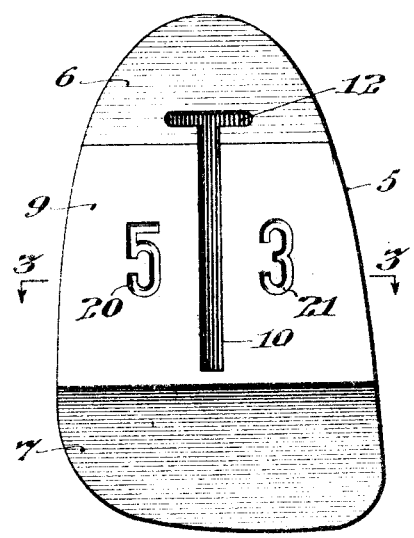

T. F. GLENN.
ARTIFICIAL TOOTH.
APPLICATION FILED DEC. 27, 1915.

1,196,227.

Patented Aug. 29, 1916.

Inventor
Thomas F. Glenn,

Witness
William J. Boswell

By
Clifton C. Hallowell
Attorney

UNITED STATES PATENT OFFICE.

THOMAS F. GLENN, OF ARDMORE, PENNSYLVANIA.

ARTIFICIAL TOOTH.

1,196,227.  Specification of Letters Patent.  Patented Aug. 29, 1916.

Application filed December 27, 1915. Serial No. 68,722.

*To all whom it may concern:*

Be it known that I, THOMAS F. GLENN, a citizen of the United States, and a resident of Ardmore, in the county of Montgomery, State of Pennsylvania, have invented certain new and useful Improvements in Artificial Teeth, of which the following is a specification, reference being had to the accompanying drawings.

My invention relates to artificial teeth in general, but is especially applicable to that class of artificial teeth commonly known as interchangeable facings, and is directed particularly to the means of designation or identification whereby the tooth may be duplicated by communicating its designating symbol to the manufacturer or dealer who is familiar with such symbol.

Heretofore it has been the common practice to provide artificial teeth with raised or embossed numbers or other designating characters, formed integral therewith and projecting from some surface of the tooth such as from the lingual bite surface of crowns, or from the neck or "ridge-lap" in vulcanite teeth, pin teeth and interchangeable facings.

In fitting artificial teeth to their mountings it is often necessary to grind off the particular surface which bears the designating symbol, and therefore it will be obvious that such symbol, which stands in relief, must first be effaced and the means of future identification be thereby destroyed. This is particularly true where a tooth facing is to have its "ridge-lap" backed; the projecting symbol must be removed before the surface of the "ridge-lap" can be ground to obtain the desired close fit between the tooth and its backing. It is also true in teeth wherein the backing does not extend over the "ridge-lap", but where it is desirable or necessary to remove the projecting symbol to present a smooth surface to the gums. Thus it will be seen that in most cases the designating symbol of the form heretofore employed loses its usefulness when the tooth is applied, and is therefore of no benefit for the future identification and duplication for the purpose of replacement.

The principal objects of my invention are, to provide artificial teeth with designating symbols which will not be effaced by the ordinary grinding of the tooth surface bearing such symbols.

Other objects of my invention are, to provide an artificial tooth with a designating symbol so formed as to produce such an impression on its mounting as may indicate the character of the tooth for purposes of identification and duplication should the tooth be damaged beyond recognition or be lost.

The form of my invention hereinafter described comprehends a tooth facing having designating symbols in the form of numerals depressed in one or more surfaces of its lingual face and arranged to receive the cement by which said tooth facing may be attached to its mounting, so that should the tooth be shattered the cement impression upon the tooth mounting will serve to indicate the character of the shattered tooth for identification purposes.

My invention also includes all of the various novel features of construction and arrangement hereinafter more definitely specified.

Figure 2:
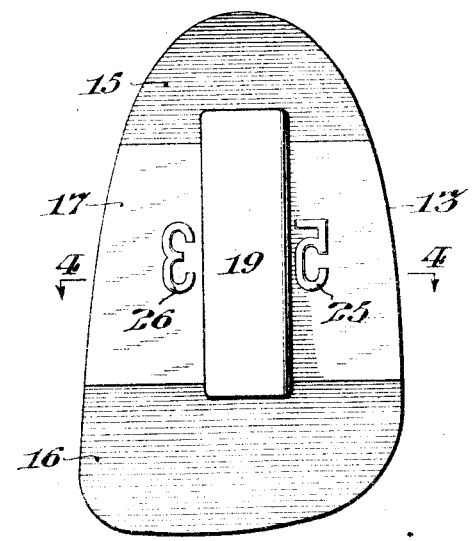
Figure 3:
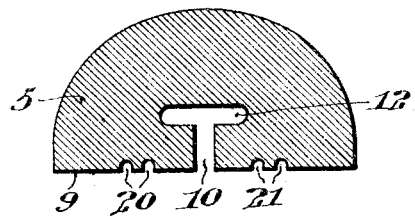
Figure 4:
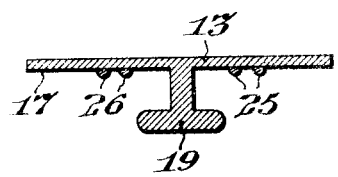

In the accompanying drawings, Figure 1 is a greatly enlarged rear elevational view of an interchangeable tooth facing conveniently embodying my invention; Fig. 2 is a similarly enlarged rear elevational view of a backing forming a suitable mounting, upon which the tooth facing shown in Fig. 1 may be supported, and showing the raised or projecting symbols in reverse order as they appear when the tooth facing has been shattered; Fig. 3 is a horizontal transverse sectional view of the tooth facing shown in Fig. 1, taken on the line 3—3 in said figure; and Fig. 4 is a horizontal transverse sectional view of the tooth backing or mounting shown in Fig. 2, taken on the line 4—4 in said figure.

In said figures, the tooth facing 5 is provided with the "ridge-lap" 6, the "bite" 7 and the intervening surface, commonly known as the "shut", 9, and has the slot 10 opening into the undercut recess 12, providing means of retention when said facing is engaged with its mounting.

The mounting may be in the form of a sheet metal backing 13, which is bent into relatively angular planes 15, 16, and 17, respectively arranged to conform to the "ridge-lap" 6, the "bite" 7 and the "shut" 9 of the tooth facing 5, and has the tongue or projection 19 arranged to enter the recess 12 in said facing and forming an anchorage therefor.

The tooth facing 5 is provided in its "shut" surface with designating symbols 20 and 21 in the form of numerals depressed below the plane of said surface, so as to permit the surface to be ground to a limited extent without obliterating said symbols.

As the tooth facing 5 is secured to the backing 13 by means of a suitable cement, it will be obvious that the cement will fill the symbolic recesses 20 and 21 so as to form similar symbols 25 and 26 projecting from the corresponding part of the backing 13, in reversed order as viewed from the rear thereof and as shown in Fig. 2, which illustrates said reversed symbols 25 and 26 as they would appear should the facing be shattered. Should, however, the tooth facing become loose and be accidentally displaced from the backing by slipping longitudinally therefrom and be lost, the projecting symbolic characters 25 and 26, shown in Fig. 2, will naturally be carried away with the tooth facing, but by reason of the relative thickness of the cement at the region local to said symbols, and the remaining surface, the impression will be plainly visible in reversed order upon the surface of the backing opposing the lingual surface of the tooth facing, and therefore it will be seen that it is immaterial whether the projecting cement symbols 25 and 26 are carried away with the tooth facing or remain intact, as shown in Fig. 2 of the drawing.

My invention is advantageous in that it obviates the necessity of uncertain, unsatisfactory and troublesome methods of taking measurements, making impressions or models of the mounting for the purpose of ascertaining the character of the tooth to be replaced.

In the form of my invention as embodied in interchangeable facings, it is purposed to have the designating symbol depressed, preferably in the surface adjoining the "ridge-lap", as shown in Fig. 1. It will be seen that by having the symbol depressed a sufficient depth, this surface may in the course of manufacture be ground to a relatively smooth plane without effacing said symbol, and, as the operator would have no occasion to again grind this surface, the symbol would not need be disturbed.

If a facing constructed in accordance with my invention be placed in the mouth, and after a time recession of the gums makes it advisable to replace it with a longer facing, the old facing may be removed, the symbolic character determined, and a longer facing of the same kind of tooth be readily substituted. Furthermore, if it be found necessary to replace a facing due to breakage, the size under ordinary conditions could be determined from the broken parts, but if said facing be so badly shattered that the designating symbol be destroyed, the character of said facing may be readily determined from the impression of the symbol on the surface of the mounting, which impression being in the reverse order would reveal the symbol, characterizing the kind, size, style or whatnot of the facing to be replaced.

It may be here noted that my invention may apply to teeth for vulcanite work and to teeth for metal casting and solder operations, for unless the designating symbol is destroyed by excessive grinding, the character of the tooth may be determined from the broken pieces or from an impression in the mounting material.

Although I have shown and described the designating symbol as disposed in the "shut" surface, it is obvious that it may be as readily located in the "ridge-lap" or "bite" surfaces, or may be otherwise disposed in other forms of teeth.

I do not desire to limit my invention to the precise details of construction and arrangement herein set forth, as it is obvious that various modifications may be made therein without departing from the essential features of my invention as defined in the appended claim.

Having thus described my invention, I claim:

An artificial tooth having a depressed designating symbol disposed in the lingual surface of said tooth.

In witness whereof, I have hereunto set my hand this 24th day of December, A. D., 1915.

THOMAS F. GLENN.

Witnesses:
WILLIAM J. RUSSELL,
CLIFTON C. HALLOWELL.